US009250013B2

(12) United States Patent
Kemper et al.

(10) Patent No.: US 9,250,013 B2
(45) Date of Patent: Feb. 2, 2016

(54) DESOLVENTIZER TOASTER WITH VAPOR RECYCLE

(71) Applicant: Desmet Ballestra North America, Inc., Marietta, GA (US)

(72) Inventors: Timothy G. Kemper, Marietta, GA (US); Marc Kellens, Muizen (BE); Philippe Van Doosselaere, Uccle (BE)

(73) Assignee: Desmet Ballestra North America, Inc., Marietta, GA (US)

( * ) Notice: Subject to any disclaimer, the term of this patent is extended or adjusted under 35 U.S.C. 154(b) by 141 days.

(21) Appl. No.: 14/224,552

(22) Filed: Mar. 25, 2014

(65) Prior Publication Data
US 2014/0202029 A1    Jul. 24, 2014

Related U.S. Application Data

(62) Division of application No. 13/322,947, filed as application No. PCT/US2010/001346 on May 6, 2010, now Pat. No. 8,720,082.

(60) Provisional application No. 61/217,921, filed on Jun. 5, 2009.

(51) Int. Cl.
*F26B 25/06*    (2006.01)
*F26B 3/02*    (2006.01)
(Continued)

(52) U.S. Cl.
CPC . *F26B 3/02* (2013.01); *A23K 1/001* (2013.01); *A23K 1/146* (2013.01); *A23L 1/0151* (2013.01); *A23L 1/2111* (2013.01); *F26B 17/005* (2013.01); *F26B 25/006* (2013.01)

(58) Field of Classification Search
CPC .......... F26B 19/00; F26B 21/00; F26B 21/06; F26B 25/00; F26B 25/06; C10G 1/002; C10G 1/04; C10G 21/14; C10G 21/16; E21B 43/00; E21B 7/00
USPC ............ 34/381, 413, 497; 208/323, 333, 390; 166/245, 267
See application file for complete search history.

(56) References Cited

U.S. PATENT DOCUMENTS 3,154,395 A    10/1964    Stine et al.
3,286,365 A    11/1966    Hackenberg
(Continued)

FOREIGN PATENT DOCUMENTS

BE    WO 2010141053 A1 * 12/2010 ............. A23K 1/001
EP    0120984 A1    10/1984
(Continued)

OTHER PUBLICATIONS

Kingsbaker, "Solvent Extraction Techniques for Soybeans and Other Seeds: Desolventizing and Toasting", XP-002596366, J. Am. Oil Chemists' Soc., vol. 47, 458A and 460A, Oct. 1970.
(Continued)

*Primary Examiner* — Stephen M Gravini
(74) *Attorney, Agent, or Firm* — Wegman, Hessler & Vanderburg

(57) ABSTRACT

An improved desolventizer toaster and methods are provided wherein a solvent vapor recycle system may be employed to recycle solvent vapor throughout a portion of the desolventizer portion of the apparatus housing. In other embodiments of the invention, a water vapor recycle system may be employed to recycle water vapor throughout a portion of the toaster portion of the apparatus housing. The solvent vapor recycle system may comprise an appropriate meal dust separator, blower and superheater. The water vapor recycle system may comprise an appropriate ejector or blower and superheater. Water vapor recovered in the solvent extraction process may be used as a water vapor feed to the heated water vapor recycling system.

16 Claims, 3 Drawing Sheets

(51) Int. Cl.
*A23K 1/00* (2006.01)
*A23K 1/14* (2006.01)
*A23L 1/015* (2006.01)
*A23L 1/211* (2006.01)
*F26B 17/00* (2006.01)
*F26B 25/00* (2006.01)

(56) References Cited

U.S. PATENT DOCUMENTS

| | | | |
|---|---|---|---|
| 3,817,259 A | | 6/1974 | Strasser et al. |
| 3,970,764 A | | 7/1976 | Karnofsky |
| 4,433,698 A | | 2/1984 | Blaul |
| 4,664,716 A | | 5/1987 | Leibig |
| 4,692,238 A | | 9/1987 | Bodle et al. |
| 5,884,417 A | * | 3/1999 | Pare .............. B01D 1/0017 34/263 |
| 5,992,050 A | | 11/1999 | Kemper et al. |
| 6,058,623 A | * | 5/2000 | Brooks ............... B01D 1/10 34/134 |
| 6,098,306 A | * | 8/2000 | Ramsey ............. F26B 3/347 134/30 |
| 6,257,157 B1 | | 7/2001 | Havens |
| 6,279,250 B1 | | 8/2001 | Anderson |
| 6,802,137 B1 | * | 10/2004 | Gray ............... F26B 21/145 34/340 |
| 7,140,122 B1 | * | 11/2006 | Adams ............... F26B 5/041 159/2.1 |
| 7,415,428 B2 | | 8/2008 | Garwood |
| 7,594,956 B2 | | 9/2009 | Knaebel |
| 7,669,349 B1 | * | 3/2010 | Palmer ............. F26B 11/16 210/770 |
| 7,857,975 B2 | | 12/2010 | Wills et al. |
| 8,196,312 B2 | * | 6/2012 | Taguchi ............ B41C 1/1083 118/65 |
| 8,720,082 B2 | * | 5/2014 | Kemper ............ A23K 1/001 210/774 |
| 2005/0109032 A1 | | 5/2005 | Harpster |
| 2006/0010712 A1 | | 1/2006 | Carin et al. |
| 2008/0051599 A1 | | 2/2008 | Adami et al. |
| 2008/0081097 A1 | | 4/2008 | Kellens et al. |
| 2009/0035428 A1 | | 2/2009 | Van Damme |
| 2009/0052912 A1 | | 2/2009 | Soji et al. |
| 2011/0201700 A1 | | 8/2011 | Lucas et al. |
| 2014/0202029 A1 | * | 7/2014 | Kemper ............ A23K 1/001 34/498 |

FOREIGN PATENT DOCUMENTS

| | | |
|---|---|---|
| EP | 2166350 A1 | 3/2010 |
| GB | 408117 | 4/1934 |
| GB | 618780 A | 2/1949 |
| GB | 682394 | 11/1952 |
| JP | 06277417 A | 10/1994 |
| JP | 2013010058 A * | 1/2013 |
| KR | 101194888 B1 | 10/2012 |
| WO | WO 98/51390 A1 | 11/1998 |

OTHER PUBLICATIONS

Paraiso et al., "Modeling and Simulation of the Soybean Oil Meal Desolventizing-Toasting Process", Journal of Food Engineering, vol. 86, pp. 334-341, 2008; ScienceDirect, www.sciencedirect.com, Oct. 22, 2007.

International Search Report and Written Opinion mailed Sep. 15, 2010 for PCT/US2010/001346 filed May 6, 2010.

International Preliminary Examination Report mailed Dec. 15, 2011 for PCT/US2010/001346 filed May 6, 2010.

Communication Pursuant to Article 94(3) EPC issued Jul. 21, 2014 in European Application No. 10 718 753.6 filed Nov. 9, 2011.

* cited by examiner

DESOLVENTIZER TOASTER WITH VAPOR RECYCLE

CROSS REFERENCE TO RELATED APPLICATION

The present application is a divisional of application Ser. No. 13/322,947 filed Nov. 29, 2011, which in turn was a 35 USC §371 national phase filing of International PCT/US2010/001346 filed May 6, 2010 which in turn claimed the priority benefit of U.S. Provisional Patent Application Ser. No. 61/217,921 filed Jun. 5, 2009.

FIELD OF INVENTION

The invention relates to an improved apparatus and process for simultaneously evaporating residual solvent from spent oilseed material while subjecting such spent oilseed material to conditions that create oilseed meal with improved protein digestibility, while maintaining low residual solvent and adequate inactivation of anti-nutritional factors.

BACKGROUND OF THE INVENTION

Oilseed crushing, the production of vegetable oil and animal feed from oilseeds, nearly always entails a solvent extraction step in which particulate, oilseed material is contacted with an organic solvent such as but not limited to hexane and its isomers to separate the liquid fraction from the solid fraction. The resultant liquid fraction is known in the trade as "miscella", a solution of vegetable oil in the organic solvent, and the resultant solid fraction is known in the trade as "spent material", the extraction residue soaked with organic solvent. After evaporating the solvent from the miscella, the crude vegetable oil is further processed to produce edible oil products. After evaporating the organic solvent present in the spent material, an oilseed meal is produced that is primarily used as a high protein animal feed ingredient.

The spent material from the solvent extraction process is generally soaked with twenty-five to thirty-five percent (25-35%) solvent by weight. The downstream process of evaporating the solvent from said spent material is known in the trade as "desolventizing", whose primary purpose is to remove the organic solvent to as low a residual solvent content as possible for both feed safety and environmental purposes.

Most oilseeds contain anti-nutritional factors (ANF) that prevent key amino acids in oilseed meals from being digested by mono-gastric animals such as poultry and swine. Said ANF generally consist of heat labile peptides such as the trypsin inhibitors present in soybeans. Accordingly, heating the oilseed meal to a sufficiently high temperature with adequate moisture present for a sufficiently long period inactivates these ANF by denaturing said peptides. The term used in the trade for this process is "toasting".

Toasting the meal simultaneously denatures the protein present in the meal. Denaturing the protein lowers the availability of the protein to be digested by mono-gastric animals such as poultry and swine, which therefore lowers the feed value of the meal in these markets. The degree of protein digestibility is often characterized in the trade by the protein digestibility index (PDI) expressed in percent. Higher PDI means higher availability of the protein to be digested. The majority of soybean meal in the trade today has a PDI in the range of twenty to thirty-five percent (20-35%).

The prior art, as exemplified by U.S. Pat. No. 5,992,050, employs equipment whereby spent material is treated in an apparatus that is known in the trade as a "desolventizer-toaster" (DT). The solvent content of the spent material is generally twenty-five to thirty-five percent (25-35%) by weight, with a moisture content of ten to twelve percent (10-12%) by weight and a temperature of 50-60° C.

The spent material continuously enters the DT vessel and drops onto a tray inside, known in the trade as a "pre-desolventizing" (PD) tray, which is an indirect steam-heated horizontal disc with a surface temperature typically 135-155° C. A shallow layer of spent material is stirred above the surface of the PD tray by stirring blades extending from a rotating centrally located shaft. Upon contacting the PD tray surface, the temperature of the spent material is increased to the boiling range of the solvent, typically 60-70° C., where the organic solvent begins to evaporate. A typical DT has two to four PD trays stacked vertically in series, where approximately ten to twenty percent (10-20%) of the initial solvent is evaporated, while the temperature remains 50-60° C. and the moisture remains relatively constant at ten to twelve percent (10-12%).

After the spent material exits the PD trays, the spent material continuously enters the next chamber of the DT vessel. The spent material drops onto a tray inside, known in the trade as a "counter-current" (CC) tray, which is an indirect steam-heated horizontal disc with a surface temperature typically 135-155° C. that has special apertures therein that allow ascending superheated water vapor to rise through. A deep layer of spent material is stirred above the surface of the CC tray by stirring blades extending from a rotating centrally located shaft. Soon after falling to the material surface of spent material supported above the CC tray, rising superheated water vapor from below condenses into the spent material layer providing latent heat to evaporate the majority of the remaining solvent from the spent material. When the spent material exits this first CC tray it will typically contain less than one percent residual solvent by weight with a moisture content of eighteen to twenty-two percent (18-22%) by weight and a temperature of 95-100° C. These moisture and temperature conditions allow for destruction of ANF and reduction of protein digestibility in the spent material.

A typical DT has two to four CC trays stacked vertically in series. After the first CC tray, the temperature and moisture remain relatively constant. The primary purpose of the remaining CC trays is to allow time for further stripping of the remaining traces of residual solvent by rising superheated water vapor and time for adequate destruction of the ANF. Reduction of the protein digestibility of the spent material continues on the remaining CC trays.

After the spent material exits the final CC tray, the spent material continuously enters the next chamber of the DT vessel. The spent material drops onto a tray inside, known in the trade as a "sparge" (SP) tray, which is a hollow horizontal disc with perforated upper surface for even distribution of superheated water vapor into the DT. A deep layer of spent material is stirred above the surface of the SP tray by stirring blades extending from a rotating centrally located shaft. The evenly distributed superheated water vapor rises through the spent material to achieve efficient removal of the remaining residual solvent to acceptable levels. Final destruction of ANF and reduction of protein digestibility also occur on the SP tray. When the desolventized, toasted meal exits the DT vessel it will typically contain less than 0.05% solvent by weight with a moisture content of eighteen to twenty-two percent (18-22%) by weight and a temperature of 105 to 110° C. The ANF of the desolventized, toasted meal as measured by urease delta pH is typically less than 0.15 and the protein digestibility as measured by PDI is typically 20-30%.

The solvent evaporated from the spent material along with an equilibrium quantity of water vapor typically exits the upper roof of the DT vessel. This vapor stream is generally 67-75° C. temperature and is composed of 90-95% solvent vapor in equilibrium with 5-10% of water vapor. This vapor stream often contains traces of meal dust and therefore passes through a vapor scrubbing apparatus before passing on to heat recovery.

In summary, it is known in the trade that the DT operates at or near atmospheric pressure and therefore the temperature of the spent material reaches a temperature just above the boiling point of water, 105-110° C. It has been found that with a typical DT apparatus and process that the amount of superheated water vapor condensation required to evaporate the remaining solvent in the spent material after the PD trays typically increases the moisture of the spent material to 20-22% by weight. It also been found that to achieve a residual solvent content in the desolventized, toasted meal at the exit of the DT of less than 500 parts per million (ppm), and preferably less than 250 ppm solvent by weight, that the spent material must remain in the CC and SP trays of the DT collectively for 20 minutes or greater with a minimum rising superheated water vapor flux rate of 300 kg/hr water vapor per $m^2$ tray surface area. It is further known that the combination of 20-30 minutes residence time at 105-110° C. and 20-22% moisture produces a meal with a protein digestibility as measured by PDI of 20-30%. This represents the present state-of-the-art apparatus, process and results in the trade.

Accordingly, there is a need in the art to provide a DT process and apparatus wherein the resultant desolventized and toasted spent material meets the industry requirements for residual solvent content and destruction of ANF, while simultaneously providing a meal product with significantly high protein digestibility as measured by PDI.

SUMMARY OF THE INVENTION

It has been discovered by analytical testing that if the spent material is subjected to a temperature of 105-110° C. for 20-30 minutes residence time at 15-17% moisture by weight that a meal can be produced with a protein digestibility as measured by PDI of 30-45%, substantially greater than the PDI of 20-30% presently known in the trade.

It has also been discovered by analytical testing that if the spent material is subjected to a temperature of 105-110° C. for 20-30 minutes residence time at 15-17% moisture by weight that a meal can be produced with an ANF as measured by urease delta pH of less than 0.15.

In one exemplary embodiment of the invention, superheated hexane vapors are used to evaporate solvent from the spent material at the beginning of the DT apparatus and process. This method allows a substantial reduction in solvent content in the spent material without increasing the spent material moisture or temperature. The result is less solvent proceeding to the uppermost CC tray which in turn requires less condensation of superheated water vapors into the spent material, which in turn allows the moisture to be controlled in the spent material in the ideal range of 15-17% by weight. Under the conditions of 15-17% moisture by weight, 105-110° C. temperature and 20-30 minutes residence time, ANF is still adequately deactivated while protein digestibility is substantially improved.

A substantial downside of higher residual solvent in the finished meal product was realized when reducing the required amount of superheated water vapor condensing into the spent material. This superheated water vapor was also acting as the stripping medium to reduce the residual solvent content in the meal to less than 500 parts per million (ppm), and preferably less than 250 ppm solvent by weight. The flux rate of the rising superheated water vapor fell below the lower threshold of 300 kg/hr/$m^2$ flux rate required to adequately strip the solvent from the spent material.

In another exemplary embodiment of this invention, water vapor is recycled from below the upper CC tray to above the SP tray of the DT. The recycled water vapor in combination with the reduced rate of rising water vapor introduced at the SP tray enables the flux rate through the spent material to be increased over the minimum acceptable flux rate of 300 kg/hr/$m^2$. Under the conditions of 15-17% moisture by weight, 105-110° C. temperature, 20-30 minutes residence time, and a superheated water vapor flux rate of greater than 300 kg/hr/$m^2$, meal can be produced with less than 500 parts per million (ppm), and ideally less than 250 ppm solvent by weight.

In summary, the ideal conditions of 15-17% moisture by weight, 105-110° C. temperature, 20-30 minutes residence time, and a superheated water vapor flux rate of greater than 300 kg/hr/$m^2$ can all be simultaneously achieved. As above noted, one aspect of the invention pertains to superheated solvent recycle at the initial stage of the DT apparatus and process. Another aspect of the invention involves superheated water vapor recycle at the final stage of the DT apparatus and process.

DETAILED DESCRIPTION OF EXEMPLARY EMBODIMENTS

Figure 1:
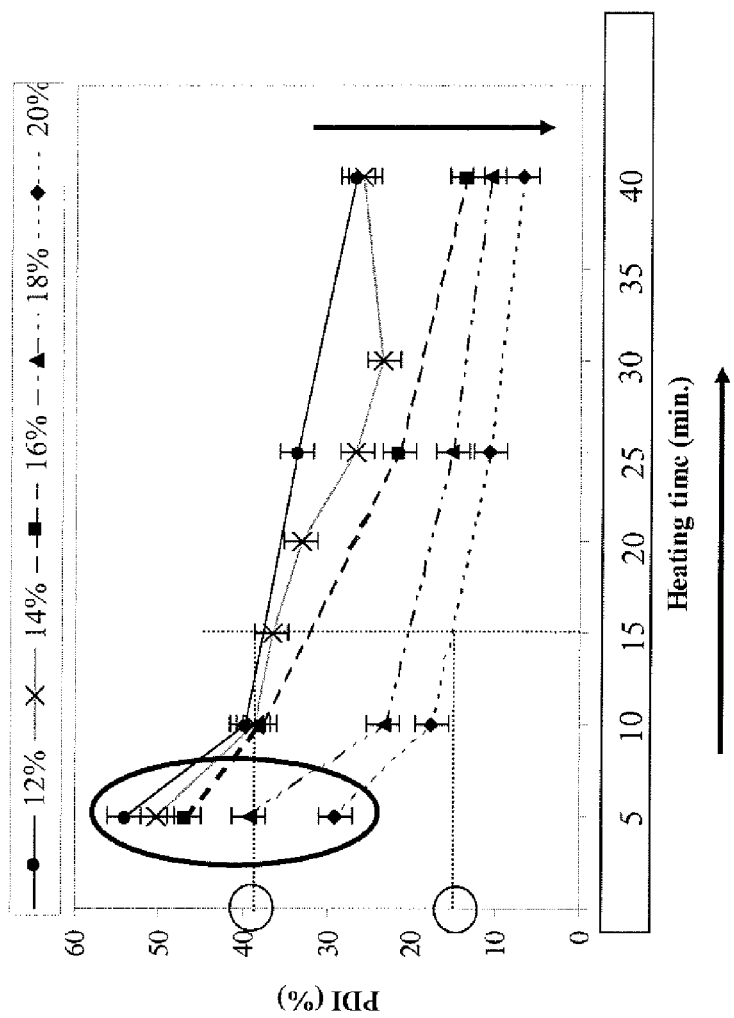
FIG. 1 is a graph illustrating data gathered from a benchtop scale DT showing the impact of PDI in meal at varying levels of moisture.
Figure 2:
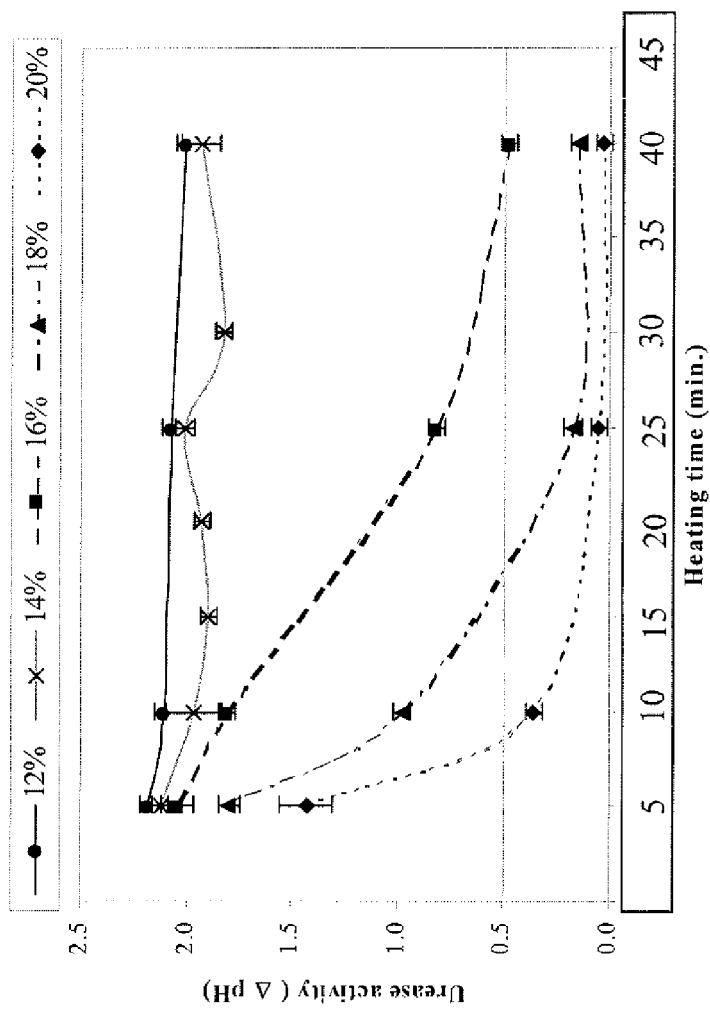
FIG. 2 is a graph illustrating data gathered from a benchtop scale DT showing the impact of ANF in meal at varying levels of moisture.
Figure 3:
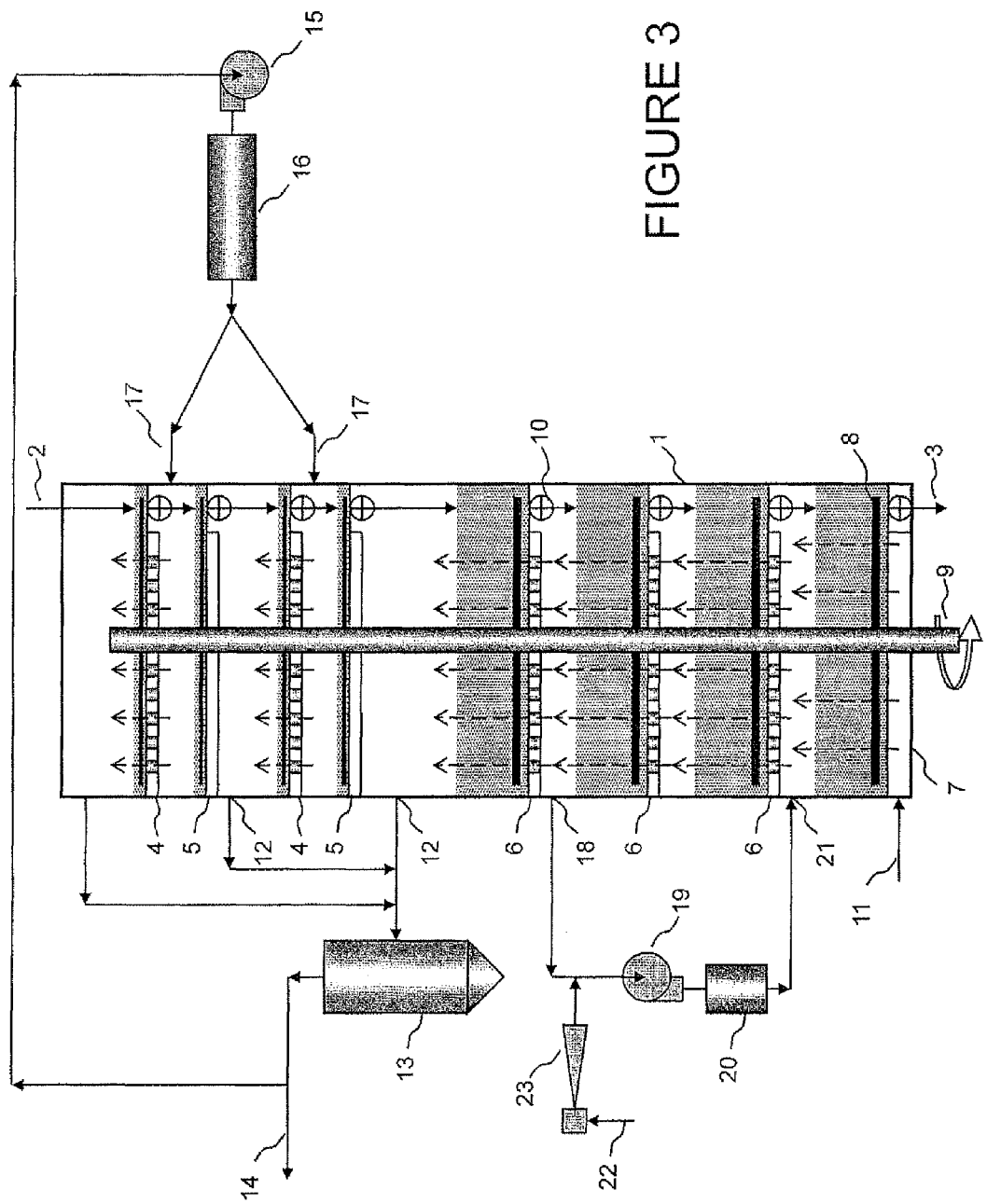
FIG. 3 is a cross-section drawing of one embodiment of the improved DT apparatus wherein both a superheated solvent vapor recycle system and superheated water vapor recycle system are employed.

With attention to FIG. 3, an apparatus is shown having superheated solvent vapor recycle and superheated water vapor recycle systems. The artisan will appreciate that either of these systems may be used by itself, or if desired, the systems may be conjointly utilized. As shown, the apparatus comprises a vertical cylindrical housing (1) with an inlet for the spent material at the top of said housing (2) and an outlet for the desolventized, toasted meal at the bottom of said housing (3). The spent material is stirred above internal trays (4,5,6,7) by agitators (8) connected to a rotating vertical shaft (9). The trays are serially arranged from an upstream location to a downstream location within the interior of the housing. The spent material passes from an upstream direction to a downstream direction from tray to tray by means of a variable speed rotary valve (10), which also controls the spent material layer depth on each tray.

The first, top, upstream tray (4) is an enclosed steam-heated tray with apertures therein which allow superheated solvent vapors from the tray below to rise through the spent material layer supported above. Solvent is primarily evaporated from the spent material on this tray by the rising solvent vapor losing its superheat, and secondarily by transfer of heat from the steam-heated tray surface. The second tray (5) is an enclosed steam-heated tray with no apertures. Solvent is evaporated from the spent material on this tray by transfer of heat from the steam-heated tray surface. This tray (5) forms a vapor seal from the tray below. These two trays (4,5) act as a pair for injection of superheated solvent vapor into the spent material. This apparatus can have as little as one and as many as four pairs of these trays (4,5) as required to supply sufficient superheated solvent to evaporate adequate solvent from the spent material prior to the spent material passing to the next zone of the DT apparatus.

The fifth, sixth and seventh trays (6) are enclosed steam-heated trays with apertures which allow superheated water vapors from the tray below to rise through the spent material layer supported above. Solvent is primarily evaporated from the spent material on these trays by the rising water vapor condensing into the spent material, and secondarily by transfer of heat from the steam-heated tray surface.

The final or most downstream tray shown (7) is an enclosed chamber with a plurality of small apertures which allow superheated water vapor in the form of low pressure steam to enter the apparatus and pass through the spent material layer supported above.

Solvent vapor with a slight amount of water vapor exits the sidewall of the apparatus as shown at exits (12) and passes to a vapor scrubbing device (13) to remove meal dust before this vapor passes on to heat recovery within the overall solvent extraction process (14).

In one aspect of the invention, the apparatus is equipped with a superheated solvent vapor recycle system. A portion of the solvent vapor with slight water vapor exiting the vapor scrubbing device (13) is pulled into a spark-proof blower (15). The spark-proof blower increases the pressure and pushes the vapors through the tubes of a shell and tube heat exchanger (16). Steam on the shell side of this heat exchanger is used to superheat the mostly solvent vapors passing through. The mostly superheated solvent vapors enter the sidewall of the vessel, between the pairs of trays (4,5) as shown at 17. These superheated vapors then rise through the apertures in the tray above, providing heat to evaporate solvent at low temperature. The cool, evaporated vapors exit the sidewall of the vessel (12) and pass to the vapor scrubbing device (13), completing the recycle loop.

In another aspect of the invention, the apparatus is equipped with a superheated water vapor recycle system. A portion of the superheated water vapor with slight solvent vapor is pulled from the sidewall of the vessel as shown at (18) under the upper countercurrent tray (6) by a spark-proof blower or steam ejector apparatus (19) which in turn passes the vapor through a steam-heated shell and tube heat exchanger (20) to optionally add superheat and then returns this vapor back through the sidewall of the vessel into the headspace above the meal of the lowest tray (7) as shown at (21). This return of vapor increases the flux rate of superheated water vapor through the layers of spent material supported on the trays (6) to improve stripping of solvent from the spent material. Water vapors (22) from the solvent extraction process may also be introduced into the superheated water vapor loop for heat recovery purposes by pushing such vapors with a steam ejector (23).

In certain forms and embodiments, the invention is directed toward an apparatus for processing spent material from a solvent extraction process wherein spent material enters the top of a vertical cylindrical vessel (1) with trays (4,5,6,7) disposed horizontally therein wherein spent material is conveyed around such trays by stirrers (8) that are connected to a vertical rotating champ (9) at the center of the vessel and such spent material is conveyed from tray to tray by rotary airlocks (10). The spent material is subjected to a combination of direct contact by superheated hexane, direct contact by superheated water vapor, and heat transferred from the trays (4,5,6) to enable the solvent to be evaporated and the spent material adequately toasted.

In accordance with another aspect of the invention, a pair of steam heated trays (4,5) is provided in the apparatus wherein the bottom tray acts as a vapor seal and the top tray acts as a superheated solvent vapor sparging device to enable significant solvent to be evaporated from spent material with a minimum rise in temperature or moisture.

In one exemplary embodiment, a superheated solvent vapor recycle loop is provided wherein primary solvent vapors, greater than 90% solvent vapor and less than 10% water vapor exit the apparatus and are returned from the vapor scrubber (13) to a vapor tight, spark proof blower (15) wherein such vapors are superheated in a steam-heated shell and tube heat exchanger (16) and then introduced through the sidewall of the vessel as shown at (17) between the pair of steam heated trays as defined above which serve as a combination vapor seal and superheated solvent vapor sparging device.

The solvent vapors rise through the spent material layer supported on the upper tray (4) evaporating solvent and such solvent exits the sidewall at the upstream end of the vessel as shown at the upstream exit and proceeds to a vapor scrubber (13) to remove meal dust. The content of the residual solvent in the spent material after the superheated solvent vapor recycle loop through water vapor condensation in uppermost deep meal layer tray (6) increases the meal moisture to 15-17% moisture, more ideally 15.5-16.5% moisture, and most preferably 16% moisture. Further, the desolventized toasted spent material exiting the apparatus has an ANF as measured by urease delta pH of 0.05 to 0.20, and more ideally, 0.010 to 0.015.

In further exemplary embodiments, the dissolved, toasted spent material exiting the apparatus has a protein solubility as measured by PDI exceeding 30% and more ideally exceeding 35%, and most preferentially exceeding 40%.

In another aspect of the invention, a superheated water vapor recycle loop is provided wherein primary water vapors, greater than 95% water vapor and less than 5% solvent vapor, are pulled through the sidewall of the vessel at the head space under the first tray as shown at (18) to a vapor type, spark proof blower or steam ejector 19 wherein such vapors are superheated in a steam heated shell and tube heat exchanger (20) and then reintroduced through the sidewall of the vessel in the head space over the last tray with deep layer material as shown at the arrow 21. Such vapors rise through the tray (6) and spent material supported above to strip out solvent. The recycled vapor flow is adjusted to obtain a flux rate through the spent material layer supported by the tray (6) of 300-700 kg/hr/m$^2$, and more ideally 400-600 kg/hr/m$^2$, and most ideally 500 kg/hr/m$^2$.

In other embodiments of the invention, the desolventized toasted spent material existing the apparatus (3) has a residual solvent content of less than 500 ppm, and more ideally less than 300 ppm, and most ideally less than 200 ppm. In another aspect of the invention, any water vapor source from the solvent extraction process can have its heat recovered by using a steam ejector 23 or the like to push the vapors into the superheated water vapor recycle loop.

While this invention has been described with reference to various illustrative embodiments, this description is not intended to be construed in a limiting sense. Various modifications of the illustrative embodiments herein shown and described, as well as other embodiments of the invention will be apparent to persons skilled in the art upon reference to this description. It is therefore contemplated that the appended claims will cover any such modifications or embodiments as followed in the true scope of the invention.

What is claimed is:

1. Method for processing spent material having solids, residual moisture, and solvent therein resulting from a precursor solvent extraction process, said method comprising conveying said spent material through a housing from an upstream entry to downstream exit, contacting said spent material with heated water vapor in said housing and volatile solvent formed in said housing, said method further comprising recycling some of said volatile solvent, said volatile recycling comprising providing a vapor solvent recycle exit in said housing, and transporting recycled solvent vapor from said vapor solvent recycle exit to a vapor solvent entry in said housing.

2. Method as recited in claim 1 further comprising superheating said recycled vapor solvent.

3. Method as recited in claim 2 wherein said spent material exiting said downstream exit has a moisture content of about 15-17% moisture.

4. Method as recited in claim 3 wherein said spent material exiting said downstream exit has a moisture content of between about 15.5-16.5% moisture.

5. Method as recited in claim 4 wherein said spent material exiting said downstream exit has a moisture content of about 16% moisture.

6. Method as recited in claim 1 wherein said spent material at said downstream exit has an ANF as measured by urease delta pH of 0.05-0.20.

7. Method as recited in claim 6 wherein said ANF as measured by urease delta pH is 0.10-0.15.

8. Method as recited in claim 7 wherein said spent material at said downstream exit has a protein solubility as measured by PDI exceeding 30%.

9. Method as recited in claim 8 wherein said spent material at said downstream exit has a protein solubility as measured by PDI exceeding 40%.

10. Method as recited in claim 1 further comprising recycling said heated water vapor, said heated water vapor recycling comprising providing a heated water vapor recycle exit in said housing and passing recycled heated water vapor from said heated water vapor recycle exit to a heated water vapor entry.

11. Method as recited in claim 10 further comprising superheating said recycled heated water vapor.

12. Method as recited in claim 11 comprising adjusting a flow rate of said recycled heated water vapor to result in a water vapor flow rate through said spent material in said housing of between about 300-700 kg/hr/m$^2$.

13. Method as recited in claim 12 wherein said spent material exiting said downstream exit has a residual solvent content of less than 500 ppm.

14. Method for processing spent material having solids, residual moisture, and solvent therein resulting from a precursor solvent extraction process, said method comprising conveying said spent material through a housing from an upstream entry to downstream exit, contacting said spent material with heated water vapor in said housing and volatile solvent formed in said housing, said method further comprising recycling some of said heated water vapor, said recycling of said water vapor comprising providing a heated water vapor recycle exit in said housing and passing recycled heated water vapor from said heated water vapor recycle exit to a heated water vapor entry in said housing.

15. Method as recited in claim 14 further comprising superheating said recycled heated water vapor.

16. Method as recited in claim 14 further comprising addition of recovered water vapor from a precursor solvent extraction process into said recycled heated water vapor.

* * * * *